(12) United States Patent
Kharul et al.

(10) Patent No.: US 9,663,624 B2
(45) Date of Patent: May 30, 2017

(54) BLEND MEMBRANES BASED ON POLYBENZIMIDAZOLE (PBI) AND POLYMERIC IONIC LIQUIDS (PILS) AND A PROCESS FOR THE PREPARATION THEREOF

(71) Applicant: Council of Scientific and Industrial Research, New Delhi (IN)

(72) Inventors: Ulhas Kanhaiyalal Kharul, Pune (IN); Sreekumar Kurungot, Pune (IN); Anita Sanwarmal Rewar, Pune (IN); Harshal Dilip Chaudhari, Pune (IN)

(73) Assignee: Council Of Scientific And Industrial Research, New Delhi (IN)

( * ) Notice: Subject to any disclaimer, the term of this patent is extended or adjusted under 35 U.S.C. 154(b) by 0 days.

(21) Appl. No.: 15/113,212

(22) PCT Filed: Jan. 21, 2015

(86) PCT No.: PCT/IN2015/000037
§ 371 (c)(1),
(2) Date: Jul. 21, 2016

(87) PCT Pub. No.: WO2015/132797
PCT Pub. Date: Sep. 11, 2015

(65) Prior Publication Data
US 2016/0340484 A1 Nov. 24, 2016

(30) Foreign Application Priority Data

Jan. 21, 2014 (IN) .......................... 0184/DEL/2014

(51) Int. Cl.
| | |
|---|---|
| *C08J 5/22* | (2006.01) |
| *H01M 8/10* | (2016.01) |
| *H01M 8/103* | (2016.01) |
| *H01M 8/1039* | (2016.01) |
| *H01M 8/1081* | (2016.01) |

(52) U.S. Cl.
CPC .............. *C08J 5/2256* (2013.01); *C08J 5/22* (2013.01); *C08J 5/2262* (2013.01); *H01M 8/103* (2013.01); *H01M 8/1039* (2013.01); *H01M 8/1081* (2013.01); *C08J 2379/04* (2013.01); *C08J 2379/08* (2013.01); *C08J 2481/08* (2013.01)

(58) Field of Classification Search
CPC .. H01M 8/103; H01M 8/1039; H01M 8/1081; C08J 5/2256; C08J 2379/04; C08J 2481/08
USPC .......................................................... 521/25
See application file for complete search history.

(56) References Cited

U.S. PATENT DOCUMENTS

| | | | | |
|---|---|---|---|---|
| 8,420,732 B2 * | 4/2013 | Dawkins | ................ | C08G 73/18 |
| | | | | 524/115 |
| 9,200,118 B2 * | 12/2015 | Kharul | ................... | C08G 73/18 |
| 9,447,242 B2 * | 9/2016 | Dawkins | ................ | C08G 73/18 |
| 2007/0122675 A1 | 5/2007 | Angell et al. | | |
| 2011/0152413 A1 * | 6/2011 | Dawkins | ................ | C08L 79/04 |
| | | | | 524/105 |
| 2012/0270122 A1 | 10/2012 | Jensen et al. | | |

FOREIGN PATENT DOCUMENTS

| | | | | |
|---|---|---|---|---|
| CN | 102945977 B | 9/2014 | | |
| DE | WO 2009083509 A1 * | 7/2009 | ............. | B01D 71/82 |
| DE | WO 2010072713 A1 * | 7/2010 | .......... | H01M 2/0277 |
| IN | WO 2012035556 A1 * | 3/2012 | ............. | C08G 73/18 |
| WO | WO 2009/083509 A1 | 7/2009 | | |
| WO | WO 2010/072713 A1 | 7/2010 | | |
| WO | WO 2012/035556 A1 | 3/2012 | | |

OTHER PUBLICATIONS

Rewar et al. "New approach of blending polymeric ionic liquid with polybenzimidazole (PBI) for enhancing physical and electrochemical properties", J. Mater. Chem. A, 2014, 2, pp. 14449-14458.*
International Preliminary Report on Patentability for International Application No. PCT/IN2015/000037 dated Aug. 4, 2016.
International Searching Authority, International Search Report and Written Opinion for International Application No. PCT/IN2015/000037, Jul. 14, 2015, 9 pages, European Patent Office, The Netherlands.
Jeffery, G.H., et al., "Vogel's Textbook of Quantitative Chemical Analysis, Fifth Edition", 1989, pp. 355-356, retrieved from <http://www.google.com/url?sa=t&rct=j&q=&esrc=s&source=web&cd=1 &ved=0ahUKEwiGyJ2roYLOAhVMTCYKHWs1CLEQFgg-cMAA&url=http%3A%2F%2Fwww.ufpa.br%2Fquimicanalitica%2FVogel's%2520-%2520Textbook%2520of%2520quantitative%2520chemical-%2520analysis%2520(5th%2520Edition%3B%2520Longmann).pdf&usg=AFQjCNEE-1kjyQOHtx2qE4tQyI3awXBWIg&bvm=bv.127521224,d.eWE> on Jul. 20, 2016.
He, R. et al., "The Acid Doping Behavior of Polybenzimidazole Membranes in Phosphoric Acid for Proton Exchange Membrane Fuel Cells", *Fibers and Polymers*, 2008, pp. 679-684, vol. 9, Issue 6, Springer, Germany.
Kumbharkar, S.C., et al., "Enhancement of gas permeation properties of polybenzimidazoles by systematic structure architecture" Journal of Membrane Science, 2006, pp. 161-169, vol. 286, Elsevier B.V., Netherlands.

* cited by examiner

Primary Examiner — Michael M Bernshteyn
(74) Attorney, Agent, or Firm — Alston & Bird LLP

(57) ABSTRACT

Blend membranes based on polybenzimidazole (PBI) and polymeric ionic liquids (PILs), wherein said PBI and aliphatic PIL blend enhances H$^+$ and OH$^-$ ions conductivity, are provided. In particular, the blend membrane includes polybenzimidazole (PBI) and poly (diallyl dimethyl ammonium) trifluoromethane sulphonate with enhanced proton and hydroxyl ion conductivity.

9 Claims, 6 Drawing Sheets

BLEND MEMBRANES BASED ON POLYBENZIMIDAZOLE (PBI) AND POLYMERIC IONIC LIQUIDS (PILS) AND A PROCESS FOR THE PREPARATION THEREOF

CROSS-REFERENCE TO RELATED APPLICATION

This application is a national phase entry of PCT/IN2015/000037, filed on 21 Jan. 2015, which claims the benefit of priority of Indian application No. 0184/DEL/2014 filed on 21 Jan. 2014, the content of which is incorporated herein by reference in its entirety for all purposes.

TECHNICAL FIELD

The present invention relates to blend membranes based on polybenzimidazole (PBI) and polymeric ionic liquids (PILs) and a process for the preparation thereof, wherein said PBI and aliphatic PIL blend enhances $H^+$ and $OH^-$ ions conductivity. In particular, the invention relates to a blend membrane comprising of polybenzimidazole (PBI) and Poly (diallyldimethylammonium)trifluoromethane sulphonate with enhanced proton and hydroxyl ion conductivity.

BACKGROUND

PBI (Polybenzimidazole), a versatile material of thermo-chemically and mechanically stable, acid doped PBI is widely demonstrated as a polyelectrolyte membrane material for High Temperature Proton Exchange Membrane Fuel Cell (HT-PEMFC), but still its conductivity needs to be improved.

The acid doping behavior of polybenzimidazole membranes in phosphoric acid for proton exchange membrane fuel cells is reported in Fibers and Polymers 9, (6), pp 679-684, 2008 by Ronghuan et al.

CN102945977 discloses a composite proton exchange membrane doped with zwitter-ion modified graphene oxide for a methanol fuel cell and a method for preparation thereof.

US2012270122 relates to a method of operating a fuel cell system with a proton exchange membrane, wherein the membrane is composed of a polymeric material comprising acid-doped polybenzimidazole (PBI).

Further, the composite membranes of PBI and ionic liquid (IL) are reported in the art to exhibit high proton conductivity at high temperatures. However, the addition of IL to PBI decreased mechanical properties of resulting PBI-IL, further the ionic liquids tend to leach out from the membrane after prolonged usage.

The PILs are anticipated to provide a continuous pathway of IL character (which is present on the repeat unit of the polymer) and also eliminate the issue of IL drain. Moreover, PILs exhibit the properties of IL such as ionic conductivity, thermal stability, tunable properties and chemical stability.

Research is now focussed to improve the proton conductivity of the membranes by incorporation of polymeric ionic liquids into PBI solution and formation of PBI-PIL blend membranes.

Research is now focussed to improve the proton conductivity of the membranes by incorporating different composites into PBI.

PIL is a unique polymer that can be used for proton conduction by blending with PBI which causes it to retain its inherent characteristics such as ionic property in backbone and high solvent solubility. Thus proton conductivity of blend membranes can be elevated considerably.

The present inventors sought to provide an alternate PIL selected from Poly (diallyl dimethyl ammonium) trifluoromethane sulphonate for improving physical and electrochemical properties and for applicability for high temperature PEMFC.

The present inventors sought to provide a PIL, poly (diallyl dimethyl ammonium) trifluoromethane sulphonate to blend with PBI for improving physical and electrochemical properties for high temperature PEMFC.

The main objective of the present invention is to provide blend membranes based on polybenzimidazole (PBI) and polymeric ionic liquids (PILs) and a process for the preparation thereof.

Accordingly, the present invention provides stable blend membrane comprising of polybenzimidazole (PBI) and polymeric ionic liquid (PIL) Poly (diallyl dimethyl ammonium) trifluoromethane sulphonate P[PDADMA][TFMS] with enhanced proton and hydroxyl ion conductivity.

In an embodiment of the present invention the weight ratio of PBI-I:PIL in the blend membrane is selected from 95:5, 85:15, 75:25, 65:35 and 55:45.

In one embodiment of the present invention said blend membrane is doped with phosphoric acid with concentration in the range of 1-17M.

In another embodiment of the present invention said blend membrane has a thickness in the range 25-300 μm.

Still in another embodiment of the present invention a process for the preparation of blend membrane of PBI and P[PDADMA][TFMS] wherein the said process comprises adding a solution of P[DADMA][TFMS] in DMSO to a solution of PBI-I in DMAc (Dimethylacetamide) at room temperature with stirring until complete mixing for 11-13 h subsequently casting the mixed solution on a flat glass surface to obtain dense blend membranes and drying in vacuum at a temperature of about 80° C. for about 8 days to remove residual solvent and doping the blend membrane with phosphoric acid.

Still in another embodiment of the present invention P[DADMA][TFMS] is prepared using anion exchange of P[DADMA][Cl] comprising adding equimolar quantity of silver salt to about 8% solution of P[DADMA][Cl] prepared in water and stirring at ambient temperature to ensure maximum possible exchange further centrifuging to separate AgCl followed by evaporation of the supernatant solution to obtain PIL, P[DADMA][TFMS].

Still in another embodiment of the present invention the silver salt is selected from metal salt of carboxylate, sulfonate, halogen, $NO_3^-$, $NO_2^-$, $PO_3^-$, $BF_4^-$, $HPO_4$—N $(SO_2CF_3)^-_2$, $H_2PO_4^-$, $HSO_4^-$, $S_2O_3^-$, $ClO^-$, $BrO_3^-$, $CrO_4^-$, $HCO_3^-$, $C_2O_4^-$, $MnO_4^-$, $NH_2^-$, $FeCl_4^-$, $PF_6^-$, $(CN)_2N^-$, $C_{16}H_{34}PO_4^-$, $C_{12}H_{25}C_6H_4O_3^-$, $SCN^-$, $CH_2=CHCOOCH_2$, $CH_2CH_2SO_3^-$, $CH_2=CHSO_3^-$, and $C_6H_4CO_3SN^-$.

Still in another embodiment of the present invention proton and hydroxyl ion conductivity of stable blend membrane is in the range 0.03-0.08 and 0.04-0.14 $Scm^{-1}$ respectively.

Still in another embodiment of the present invention stable blend membrane of PBI-I and P[PDADMA][TFMS] is useful as membrane electrolyte for high temperature PEMFC.

The present invention provides mechanically and thermally stable blend membrane comprising of polybenzimidazole (PBI) and polymeric ionic liquid (PIL) Poly(diallyldimethylammonium)trifluoromethane sulphonate, in varying ratios, with enhanced proton and hydroxyl ions conductivity. The weight ratio of PBI-I:PIL in the blend membrane is selected from 95:5, 85:15, 75:25, 65:35 and 55:45.

The excellent mechanical stability of the membrane is one of the important requirements for applicability in high temperature PEMFC. In an aspect, the blend membranes of the instant invention are doped with phosphoric acid with concentration ranging from 1-17 M. The formed blend membranes are observed to be stable to doping with phosphoric acid of concentration 15M.

In another aspect, the invention provides preparation of polybenzimidazole which comprises polycondensation reaction of 3,3'-diaminobenzidine (DAB) and isophthalic acid, in presence of polyphosphoric acid (PPA) at elevated temperature of 120-250° C. as reported earlier in the art.

In an aspect, the present invention provides a process for preparation of Poly (diallyl dimethyl ammonium) trifluoromethane sulphonate based on aliphatic backbone using anion exchange of poly(diallyldimethylammonium chloride), P[DADMA][Cl] in suitable concentration. The metal salt for anion exchange is selected from metal salt of methyl sulphonate, trifluoro methyl sulphonate and p-toluene sulphonate and other salts. The metal halide is separated by centrifugation or other known techniques. The desired polymeric ionic liquid is obtained by evaporation of the supernatant solution (cf scheme 2).

Additionally, the anion exchange salt may be selected from the metal salt of carboxylate, sulfonate, halogen, $NO_3^-$, $NO_2^-$, $PO_3^-$, $BF_4^-$, $HPO_4$—$N(SO_2CF_3)^-_2$, $H_2PO_4^-$, $HSO_4^-$, $S_2O_3^-$, $ClO^-$, $BrO_3^-$, $CrO_4^-$, $HCO_3^-$, $C_2O_4^-$, $MnO_4^-$, $NH_2^-$, $FeCl_4^-$, $PF_6^-$, $(CN)_2N^-$, $C_{16}H_{34}PO_4^-$, $C_{12}H_{25}C_6H_4O_3^-$, $SCN^-$, $CH_2$=$CHCOOCH_2$, $CH_2CH_2SO_3^-$, $CH_2$=$CHSO_3^-$, and $C_6H_4CO_3SN^-$.

The anion exchange of PIL is evaluated by estimation of chloride content in formed PIL by known Volhard's method [G. H. Jeffery, J. Bassett, J. Mendham and C. Denney, Vogel's Textbook of Quantitative Chemical Analysis, British Library Cataloguing in Publication Data, 5th edn, 1989, pp. 355-356.].

In another aspect, the present invention provides a process for preparation of said blend membrane. The process includes adding a solution of P[DADMA][TFMS] dissolved in DMSO to a solution of PBI-I dissolved in DMAc (3% solution) at room temperature with stirring until complete mixing; casting the mixed solution on a flat glass surface to obtain dense blend membranes and drying in vacuum for about 8 days to remove residual solvent. The blend membrane is further doped with phosphoric acid. The thickness of the blend membrane is in the range of 25-300 μm.

In yet another aspect, the present invention provides the blend membrane of PBI-I and Poly (diallyl dimethyl ammonium) trifluoromethane sulphonate which show increase in proton conduction in comparison to the PBI membranes alone due to the presence of ionic groups of PILs in blend membranes. Single cell were successfully tested with blend membranes at 160° C.; the obtained maximum power density and current density were also higher than the pristine PBI-I membrane.

In another aspect the invention present invention provides polybenzimidazole (PBI) having formula I,

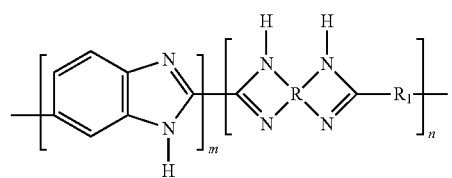

Formula-I

In another aspect the invention present invention provides polymeric ionic liquids (PILs) having formula IV,

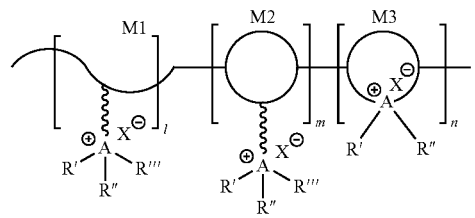

Formula IV wherein, the substituent are represented in detailed description herein below.

Figure 1:
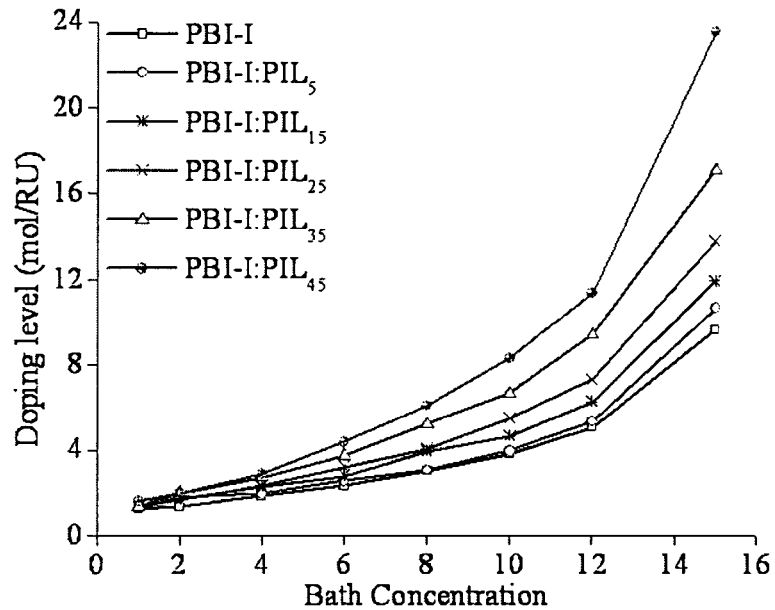
FIG. 1 depicts $H_3PO_4$ doping level of blend membranes in different molarity of acid.

ABBREVIATIONS (DAB): 3,3'-Diaminobenzidine
(PBI): Polybenzimidazole
(PILs): Polymeric ionic liquids
(DMAc): Dimethylacetamide
(PPA): Polyphosphoric acid
P[DADMA][TFMS]: Poly(diallyldimethylammonium)trifluoromethane sulphonate
(PBI-I): Polybenzimidazole derived from isophthalic acid and DAB

DETAILED DESCRIPTION

The present invention provides mechanically and thermally stable blend membrane comprising of polybenzimidazole (PBI) and polymeric ionic liquid (PIL) Poly(diallyldimethylammonium)trifluoromethane sulphonate, in varying ratios, with enhanced proton and hydroxyl ions conductivity.

To mitigate the issues in the use of IL or phosphoric acid doped PBI alone and the promising benefits of combining PILs with the polymer, the present invention provides an alternate blend membrane by locating the IL moiety in polymeric backbone, which results in the synergistic effect of both components that lead to enhanced physical and electrochemical properties due to perfect miscibility.

In accordance with the above, the invention relates to blend membrane based on polybenzimidazole (PBI) and polymeric ionic liquids (PILs), which enhances or ameliorates proton as well as hydroxide ion conductivity after doping with phosphoric acid or alkali, respectively.

The present invention discloses mechanically and thermally stable blend membrane comprising of polybenzimidazole (PBI) and polymeric ionic liquid synthesized by Poly (diallyl dimethyl ammonium) trifluoromethane sulphonate with enhanced proton and hydroxyl ion conductivity.

The weight ratio of PBI-I:PIL in the blend membrane is selected from 95:5, 85:15, 75:25, 65:35 and 55:45.

The polybenzimidazoles of the membrane of the invention is of formula I,

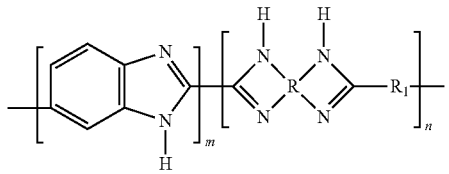

Formula-I where (m+n)=1; R is tetraamine monomer having formula II,

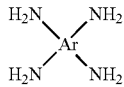

Formula-II wherein, 'Ar' is mono and polycyclic aromatic hydrocarbons selected from the group consisting of benzene, naphthalene, anthracene, phenanthrene, pyrene, benzo[a]pyrene, dibenzo[a,l]pyrene, coronene, triphenylene, azulene, indene, flourene, or heterocyclic aromatic compounds selected from the group consisting of furan, thiophene, pyrrole, pyridine, or polycyclic heterocyclic compounds selected from the group consisting of carbazole, indole, quinoline, quinoxaline or biphenyl, or two aromatic rings fused with X; wherein X is selected from the group consisting of —$CH_2$—, —O—, —$SO_2$—, —$C(CH_3)_2$—, —$C(CF_3)_2$—, —C(alkyl or aromatic or substituted aromatic)$_2$-, $C_{1-25}$ alkyl or aryl groups.

wherein 'Ar' can also be substituted or unsubstituted with the same or different R groups or combination of R groups, where R is selected from the group consisting of hydrogen, halide, $NO_2$ or $C_{1-24}$ alkyl or aryl groups, wherein the aryl group comprises hydrogen, halogen, oxygen, nitrogen, aromatic ring, arylene, alkylene, arylene-ether or heterocyclic ring selected from the group consisting of pyridine, pyrazine, furan, quinoline, thiopene.

where $R_1$ is dicarboxylic acid of formula III;

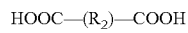

Formula-III wherein $R_2$ is selected from the group consisting of aliphatic, mono- or polynuclear aromatic hydrocarbons, substituted mono- or polynuclear aromatic hydrocarbons or combination thereof, aromatic fused rings with X; wherein X is selected from the group consisting of —$CH_2$—, —O—, —$SO_2$—, —$C(CH_3)_2$—, —$C(CF_3)_2$—, —C(alkyl or aromatic or substituted aromatic)$_2$-, $C_{1-25}$ alkyl or aryl groups, optionally comprising heteroatoms selected from the group consisting of N, O, S, P, in the form of substituent, linker or part of aromatic moiety.

The aliphatic polymeric ionic liquids (PILs) in the instant blend membrane, is of formula IV.

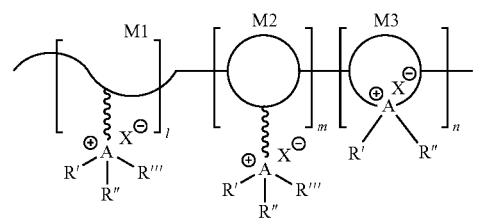

Formula IV wherein; (l+m+n=1); M1 represents straight chain, M2 and M3 represents cyclic systems where 'A' is heteroatom selected from the group consisting of N or P as a heteroatom which is suitably substituted with R', R", R'" in order to possess cationic form of N and P;

R', R" and R'" selected from the group consisting of alkyl, aromatic groups, optionally possessing functionality X, wherein X is selected from the group consisting of carboxylate, sulfonate, halogen, $NO_3^-$, $NO_2^-$, $PO_3^-$, $BF_4^-$, $HPO_4$—$N(SO_2CF_3)^-_2$, $H_2PO_4^-$, $HSO_4^-$, $S_2O_3^-$, $ClO^-$, $BrO_3^-$, $CrO_4^-$, $HCO_3^-$, $C_2O_4^-$, $MnO_4^-$, $NH_2^-$, $FeCl_4^-$, $PF_6^-$, $(CN)_2N^-$, $C_{16}H_{34}PO_4^-$, $C_{12}H_{25}C_6H_4O_3^-$, $SCN^-$, $CH_2$=$CHCOOCH_2$, $CH_2CH_2SO_3^-$, $CH_2$=$CHSO_3^-$, and $C_6H_4CO_3SN^-$.

The present invention provides preparation of polybenzimidazole which comprises polycondensation reaction of 3,3'-diaminobenzidine (DAB) and isophthalic acid, as reported earlier [Santosh C. Kumbharkar, Prasad B. Karadkar, Ulhas K. Kharul*Journal of Membrane Science 286 (2006) 161-169, 2006] in presence of polyphosphoric acid (PPA) at elevated temperature of 120-250° C., followed by precipitation, washing and purification (cf scheme 1).

Scheme 1. Synthesis of PBI

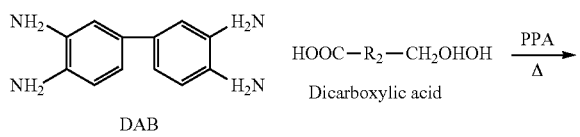

-continued

[PBI structure diagram]

PBI wherein R2 represents Formula III

The invention provides preparation of PIL (polymeric ionic liquid) based on aliphatic backbone using anion exchange of poly (diallyldimethylammonium chloride), P[DADMA][Cl] in suitable concentration. The metal salt for anion exchange is selected from metal salt of methyl sulphonate, trifluoro methyl sulphonate and p-toluene sulphonate and other salt as described in formula IV. The metal halide is separated by centrifugation or other known techniques. The desired polymeric ionic liquid is obtained by evaporation of the supernatant solution (cf scheme 2).

Additionally, the anion exchange salt may be selected from the metal salt of carboxylate, sulfonate, halogen, $NO_3^-$, $NO_2^-$, $PO_3^-$, $BF_4^-$, $HPO_4^-$—$N(SO_2CF_3)^-_2$, $H_2PO_4^-$, $HSO_4^-$, $S_2O_3^-$, $ClO^-$, $BrO_3^-$, $CrO_4^-$, $HCO_3^-$, $C_2O_4^-$, $MnO_4^-$, $NH_2^-$, $FeCl_4^-$, $PF_6^-$, $(CN)_2N^-$, $C_{16}H_{34}PO_4^-$, $C_{12}H_{25}C_6H_4O_3^-$, $SCN^-$, $CH_2$=$CHCOOCH_2$, $CH_3CH_2SO_3^-$, $CH_2$=$CHSO_3^-$, and $C_6H_4CO_3SN^-$.

The anion exchange of PIL is evaluated by estimation of chloride content in formed PIL by known Volhard's method [G. H. Jeffery, J. Bassett, J. Mendham and C. Denney, Vogel's Textbook of Quantitative Chemical Analysis, British Library Cataloguing in Publication Data, 5th edn, 1989, pp. 355-356.], Scheme 2. Synthesis of PILs based on P[DADMA][Cl]

[Scheme 2 diagram: P[DADMA][Cl] + 1 eq. MX, Water → P[DADMA][X]]

Where,
M = Metal ion
X = Any anion that described above

The process for preparation of blend membrane of PBI-I:P[DADMA][TFMS] in different weight ratio comprising mixing of PBI and PIL solution at room temperature in presence of suitable solvent, followed by stirring to obtain dense blend membranes by casting the solution at elevated temperature. The membrane or film is peeled off and dried in a vacuum, where the thickness of the blend membrane is in the range of 25-300 µm. The elevated temperature is in the range of 70-200° C. and the suitable organic solvent is selected from the group consisting of toluene, DMSO, DMAc and like thereof.

The blend membrane is further doped with phosphoric acid. in an embodiment, the present invention discloses the polymeric blend membrane of P[DADMA][TFMS]-5, PBI+P[DADMA][TFMS]-15, PBI+P[DADMA][TFMS]-25, PBI+P[DADMA][TFMS]-35 and PBI+P[DADMA][TFMS]-45.

The present invention provides MEA comprising the phosphoric acid doped blend membrane of PBI and P[DADMA][TFMS] sandwiched between the anode and cathode electrode by hot pressing at 130° C. and a pressure of 0.5 ton $cm^{-2}$. In another embodiment, the present invention discloses the characterization of blend membrane comprising PBI and P[DADMA][TFMS]. The physical properties of PBI, PIL and the blend membrane are given below in Table 1.

Further, the hydrolytic stability and oxidative stability of the instant blend membrane is evaluated, where PBI+P[DADMA][TFMS] blend membrane is hydrolytically stable for more than 2 weeks. The oxidative stability of blend, preferably PBI+P[DADMA][TFMS] decreases with increase in P[DADMA][TFMS] concentration (cf Table 2).

The PBI+P[DADMA][TFMS] blend membrane is doped in (1-17 M) $H_3PO_4$ at room temperature. The concentration of $H_3PO_4$ is directly proportional to the doping level of membranes which leads to stable membrane, useful for fuel cell application. The doping level of blend membranes in different molarity of acid (1M to 17M) is in the range of 1 to 25 mol/RU) (cf Table 3).

The gas permeability of blend membranes based on PBI+P[DADMA][TFMS] is measured at upstream pressure of 20 atm at 35° C. The hydrogen gas permeability of blend, PBI-I:[PDADMA][TFMS] is in the range of 0.40 to 1.0 Barrer, whereas oxygen permeability is in the range of 0.005 to 0.05 Barrer (cf Table 4).

The proton conductivity of blend membrane is carried out by an impedance analyzer with a cell, in which the electrolyte films are sandwiched between two symmetrical gold coated stainless-steel electrodes and connected to the analyzer by Pt wires over the frequency range from 10 Hz to 1 MHz with amplitude of 5-20 mV at different temperature range of 50-150° C.

The blend has proton conductivity (a) in the range of 0.01 to 0.08 S/cm at a temperature in the range of 30 to 150° C. (cf FIG. 2). The blend is being studied for its hydroxyl ion conductivity. The maximum power density and current density obtained were 515 mW $cm^{-2}$ and 1632 mA $cm^{-2}$, respectively, for PBI-PIL$_{25}$-based MEA.

The stable blend membrane of the current invention thus enables an attractive combination for permeation of H+ and OH— ions useful for proton exchange membrane-based fuel cells (PEMFC) operating at high temperature.

The present invention relates to the use of blend membrane of the current invention as membrane electrolyte for high temperature PEMFC. The invention will now be illustrated with help of examples.

EXAMPLES

The following examples are given by way of illustration of the working if the invention is actual practice and shall not be construed to limit the scope of the present invention in anyway.

Example 1: Synthesis of Polybenzimidazole (PBI-I)

Polybenzimidazole was synthesized by polycondensation reaction of DAB and isophthalic acid, (PBI-I) as reported earlier [S. C. Kumbharkar, P. B. Karadkar and U. K. Kharul, J. Membr. Sci. 286 (2006) 161-169]. A three-necked flask equipped with a mechanical stirrer, $N_2$ inlet and $CaCl_2$ drying tube was charged with 300 g of PPA, 10 g (0.04667 mol) of DAB and temperature was elevated to 140° C. After dissolution of DAB, 0.04667 mol of isophthalic acid was added; temperature was slowly raised to 170° C. and maintained for 5 h under constant flow of N$_2$. The temperature was further raised to 210° C. and maintained for 12 h. The polymer was obtained by precipitation in water. It was crushed, thoroughly washed with water, kept in 10% NaHCO$_3$ for 16 h; followed by water wash until filtrate was neutral to pH. The polymer was then soaked in acetone for 16 h, filtered and dried in vacuum oven at 100° C. for 7 days. Further purification by dissolving in DMAc (3% w/v) and reprecipitation in water yielded yellow colored fibrous polymer.

Example 2: Synthesis of Polymeric Ionic Liquid (PIL)

For preparation of PIL (polymeric ionic liquid) based on aliphatic backbone, anion exchange of P[DADMA][Cl] was carried out. Accordingly, 8% solution of P[DADMA][Cl] was prepared in water, equimolar quantity of Ag salt of methyl sulphonate, trifluoro methyl sulphonate and p-toluene sulphonate was added, respectively, while stirring at ambient temperature. As the replacement of Cl$^-$ with the anion progressed, AgCl precipitated out. Stirring was continued for 24 h to ensure maximum possible exchange. The mixture was centrifuged at 12000 rpm to separate AgCl. The product polymer was obtained by evaporation of the supernatant solution.

The anion exchange of PIL was evaluated by estimation of chloride content in formed PIL by Volhard's method [G. H. Jeffery, J. Bassett, J. Mendham and C. Denney, Vogel's Textbook of Quantitative Chemical Analysis, British Library Cataloguing in Publication Data, 5th edn, 1989, pp. 355-356.], in which 0.1 g of PIL in powder form was stirred in 20 ml of 0.01M AgNO$_3$ solution for 24 h. Excess of unreacted AgNO$_3$ was titrated with 0.01 M KSCN. From the amount of AgNO$_3$ consumed initially, chloride content (and thus anion exchange) in the PIL was estimated.

Scheme 3. Synthesis of PILs based on P[DADMA][Cl]

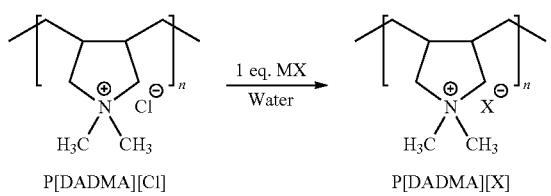

Where,
M = Ag$^+$,
X = CH$_3$SO$_3$$^-$ (MS), CF$_3$SO$_3$$^-$ (TFMS), CH$_3$C$_6$H$_4$SO$_3$$^-$ (PTS), Example 3: Preparation of Blend Membranes Based on PBI-I and P[DADMA][TFMS]

PBI-I:PIL blend membranes were prepared, in their, 95:5, 85:15, 75:25, 65:35, 55:45 weight ratio. PBI-I was dissolved in DMAc (3% solution) at 80° C. for 12 h with continuous stirring and P[DADMA][TFMS] was dissolved in minimum amount 10 ml of DMSO by stirring at RT for 12 h. PIL solution was subsequently added to the solution of PBI-I at room temperature while stirring followed by stirring for 24 h to confirm maximum mixing. The dense blend membranes were obtained by casting this mixed solution at 90° C. on a flat glass surface for 24 h in an oven. Formed film was peeled off and dried in a vacuum oven at 80° C. for 8 days in order to remove residual solvent. The average thickness of membranes for proton conductivity measured was around 70 μm.

Figure 3:
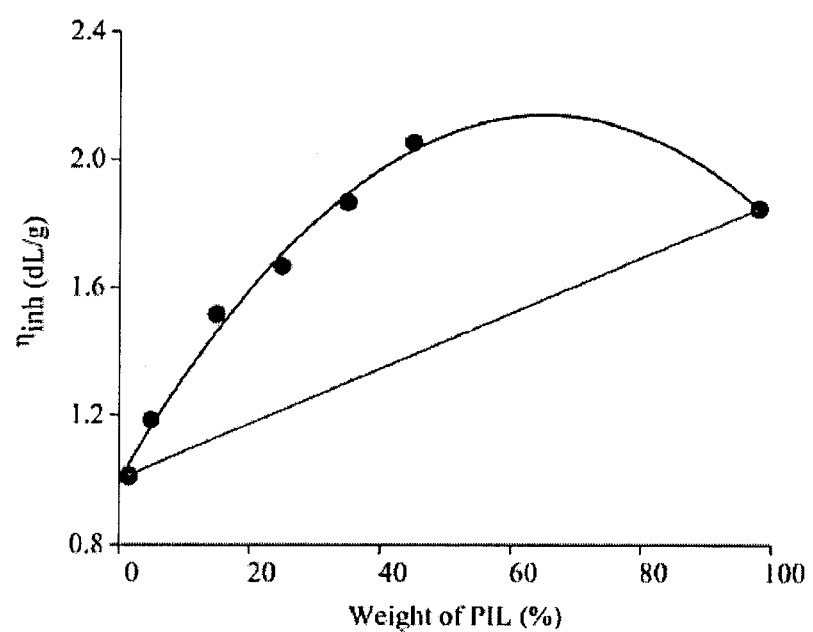
FIG. 3 depicts Variation in inherent viscosity of PBI-PIL blend membranes with composition.

The inherent viscosity ($\eta_{inh}$) was determined using 0.2 g/dL PBI solution in DMSO at 35° C. (FIG. 3).

Example 4: a. Spectral and Physicochemical Characterization

Figure 4:
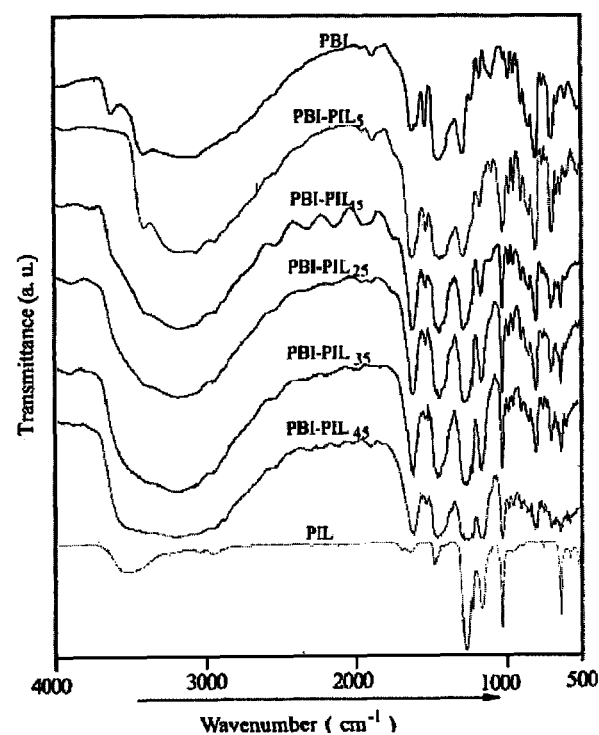
FIG. 4 depicts FTIR spectra of PBI-PIL blend membranes.
Figure 5:
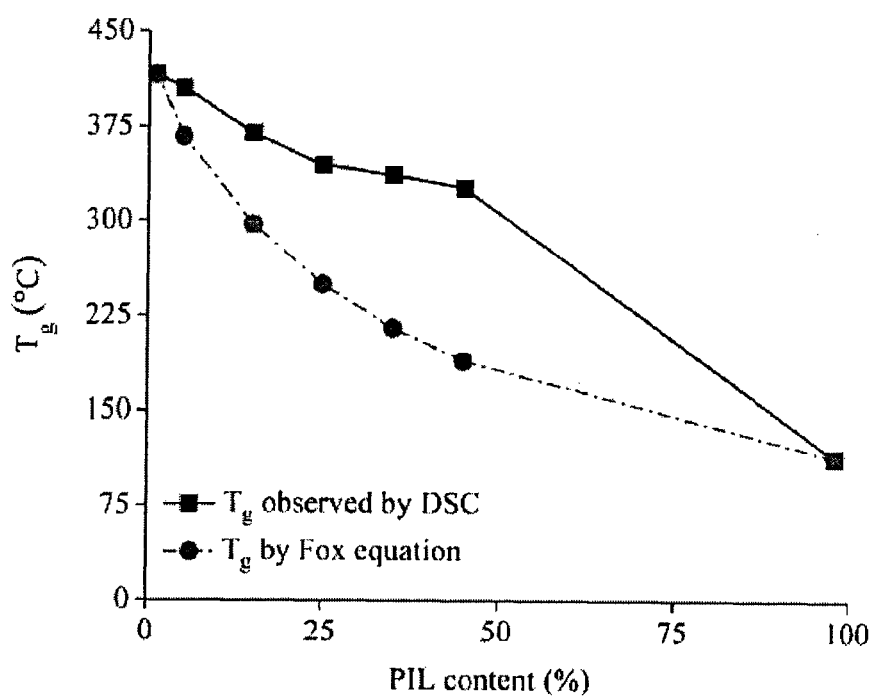
FIG. 5 depicts composition dependence of the Tg determined by DSC (■) and that calculated by the Fox equation ( ).
Figure 6:
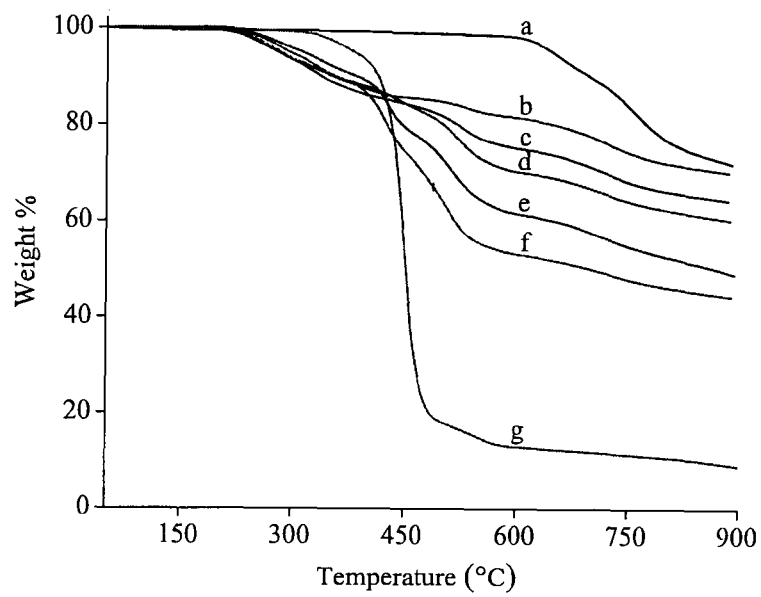
FIG. 6 depicts TGA curve of PBI-PIL blend membranes ((a) PBI, (b) PBI-PIL$_5$, (c) PBI-PIL$_{15}$, (d) PBI-PIL$_{25}$, (e) PBI-PIL$_{35}$, (f) PBI-PIL$_{45}$).

The FTIR spectra of all the PBI-PIL blend membranes exhibited typical bands corresponding to the benzimidazole of PBI (1430, 1600 and 1620 cm$^{-1}$) as well as the sulfone group (1030 cm$^{-1}$) of PIL (FIG. 4). From FIG. 4, it is evident that with increasing PIL content in the blend, the free non-hydrogen bonded N—H stretching band at 3434 cm$^{-1}$, present in pristine PBI, showed a substantial broadening and displacement to lower frequencies. The red shift and the peak broadening are indicative of interactions between the PBI with PIL. It was thus concluded that interactions between the imidazole N—H of PBI and the ionic nature of PIL were responsible for offering miscible blends.

b. Thermal Properties of the Blend were Studied by TGA and DSC Under N$_2$ Atmosphere (FIGS. 6 and 7)

The decomposition temperatures of PBI and PIL were approx. 600° C. and 375° C. respectively. For the blend membranes, a two-step degradation pattern was observed (FIG. 6). The first degradation beginning at approx. 240° C. corresponds to approx. 15% weight loss. This temperature was observed to be far below than the IDT of either of the precursor polymers. Since these samples were dried at 100° C. in the vacuum oven for 7 days prior to the analysis and were again subjected to a temperature up to 150° C. before recording the TGA, it was unlikely that the observed degradation with 15% wt loss could be ascribed to the presence of water. It may be possible that anions of PIL became more labile due to interactions with PBI's N—H group and became responsible for the weight loss. The second abrupt degradation which starts at >400° C., can be correlated to the degradation of the PIL backbone. The char yield of the blend membrane at 900° C. decreased with the increase in the amount of PIL, as anticipated, since the char yield of PIL was much lower than that of PBI. Although the thermal stability of the blend membranes decreased in comparison to the parent PBI, it was high enough (≥240° C.) for their applicability as the membranes for HT-PEMFC.

Figure 7:
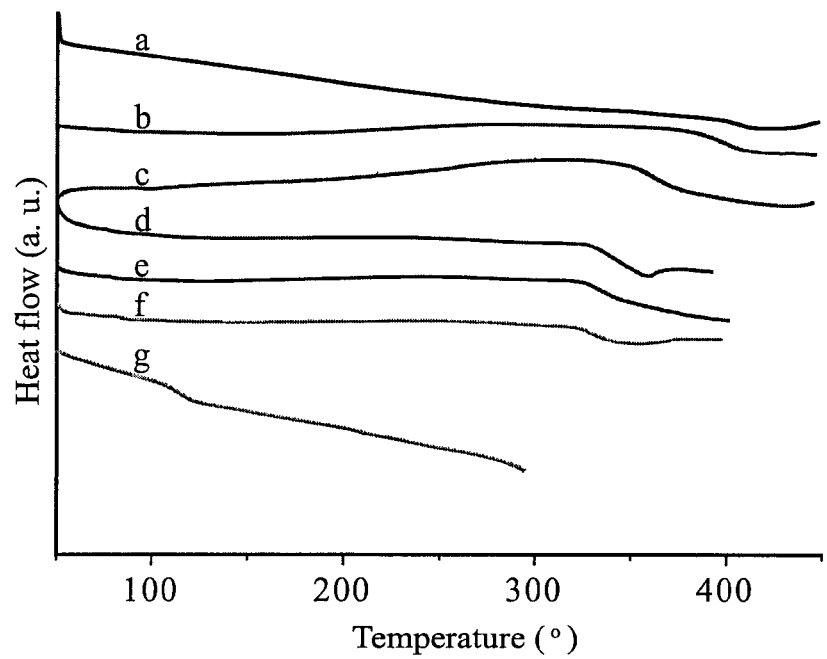
FIG. 7 depicts DSC curve of PBI-PIL blend membranes ((a) PBI, (b) PBI-PIL$_5$, (c) PBI-PIL$_{15}$, (d) PBI-PIL$_{25}$, (e) PBI-PIL$_{35}$, (f) PBI-PIL$_{45}$).

The DSC thermograms of PBI, PIL and their blends with different compositions are shown in FIG. 7.

The T$_g$ of all blend membranes were higher than predicted by the Fox equation, indicating the presence of strong interactions in individual blend component A single T$_g$ of a blend, which lies between the glass transition temperatures of individual components (PBI and PIL), further confirms the miscible nature of the present PBI-PIL blends. (Table 1)

All the blend membranes were thermally and mechanically stable and could be used for high temperature proton exchange membrane fuel cell. The thermal and mechanical stability were studied by TGA in N$_2$ and tensile strength testing respectively. The physical properties are given in Table 1 below.

TABLE 1

Physical properties of PBI, PIL and the blend membrane

| Membrane | $d_{sp}{}^a$ (Å) | Thermal analysis | | |
|---|---|---|---|---|
| | | $IDT^b$ (° C.) | Char yield (%) | $T_g$ (° C.) |
| PBI | 3.63 | 600 | 72 | 416 |
| PBI-PIL$_5$ | 4.0 | 530 | 70 | 405 |
| PBI-PIL$_{15}$ | 3.89 | 528 | 64 | 370 |
| PBI-PIL$_{25}$ | 4.35 | 449 | 60 | 345 |
| PBI-PIL$_{35}$ | 4.10 | 417 | 49 | 337 |
| PBI-PIL$_{45}$ | 4.14 | 407 | 44 | 327 |
| PIL | 5.12 | 375 | 9 | 114 |

Example 5: Analysis of Hydrolytic and Oxidative Stability of Blend Membranes Hydrolytic Stability of the membrane samples having rectangular size 2×1 cm$^2$ and thickness 90-100 μm was evaluated by immersing them in deionised water at 80° C. The water bath was adjusted at a lower speed of 30 rpm for continuous shaking. Hydrolytic stability was then determined by recording the immersion period required for breaking the film when bent slightly, due to loss of flexibility. All blend membranes are hydrolytically stable more than 2 weeks.

Oxidative stability of all blend membranes was studied by determining the elapsed time for the membranes to disintegrate or their complete dissolution into Fenton's reagent (3% H$_2$O$_2$ and 3 ppm FeSO$_4$) at 80° C.

TABLE 2

Oxidative stability of blend membranes

| Membrane | Weight loss in % | |
|---|---|---|
| | 12 hr | 18 hr |
| PBI-I | 0.091 | 1.12 |
| PBI-I + P[PDADMA][TFMS]-5 | 9.25 | 10.97 |
| PBI-I + P[PDADMA][TFMS]-15 | 13.20 | 14.50 |
| PBI-I + P[PDADMA][TFMS]-25 | 15.83 | Break |
| PBI-I + P[PDADMA][TFMS]-35 | 21.20 | Break |
| PBI-I + P[PDADMA][TFMS]-45 | 37.03 | Break |

Oxidative stability decreases in the order to PBI-I > PBI + P[DADMA][TFMS]-5 > PBI + P[DADMA][TFMS]-15 > PBI + P[DADMA][TFMS]-25 > PBI + P[DADMA][TFMS]-35 > PBI + P[DADMA][TFMS]-45 (Table 1).

Example 6: Acid Doping of Blend Membranes

All the blend membranes were doped in 15 M H$_3$PO$_4$ at room temperature for 3 days. To avoid change in concentration of the acid, doping was done in a closed container. After the acid doping, blend membranes were removed from the acid solution, blotted with filter paper and the weight and dimension were measured. H$_3$PO$_4$ doping of dried membranes (100° C., 1 week) was determined by gravimetric method. The following equation [Kumbharkar, 2009] was used for calculation of acid uptake.

$$H_3PO_4 \text{ doping level} = \frac{308(W_1 - W_2)}{98 \times W_2}$$

Where, $W_1$ and $W_2$ are initial and dry weight of membrane, respectively.

FIG. 1. Show that with increasing bath concentration of H$_3$PO$_4$, doping level of the membranes increased. It was encouraging to observe that formed membranes were stable even in 15M H$_3$PO$_4$ and thus useful for fuel cell application. The data of doping level are given below in Table 3.

TABLE 3

Doping level of blend membranes in different molarity of acid

| Membrane | H$_3$PO$_4$ uptake (Mol/RU) Molarity of acid | | | |
|---|---|---|---|---|
| | 2M | 6M | 10M | 15M |
| PBI-I | 1.8 | 2.4 | 3.9 | 10.2 |
| PBI-I + P[PDADMA][TFMS]-5 | 1.8 | 2.5 | 4.0 | 10.7 |
| PBI-I + P[PDADMM][TFMS]-15 | 1.7 | 2.7 | 4.7 | 12.0 |
| PBI-I + P[PDADMA][TFMS]-25 | 1.7 | 3.2 | 5.5 | 13.8 |
| PBI-I + P[PDADMA][TFMS]-35 | 2.0 | 3.8 | 6.7 | 20.4 |
| PBI-I + P[PDADMA][TFMS]-45 | 2.0 | 4.4 | 8.3 | 23.6 |

Example 7: Gas Permeability Analysis of Blend Membranes Based on PBI and [PDADMA][TFMS]

Variable volume method was used for the determination of gas permeability of blend membranes. The upstream pressure used was 20 atm at 35° C., while permeate side was maintained at the atmospheric pressure in order to measure volume of permeated gas. Permeate side of the cell was connected to a calibrated glass capillary containing small mercury slug (0.5 cm in length). The volume of permeated gas was measured by mercury slug displacement. The permeability was calculated using the equation given below:

$$P = \frac{N \cdot l}{(p_1 - p_2)}$$

where P is the permeability coefficient expressed in Barrer, $P_1$ and $P_2$ are the permeate side and feed side pressure (cm Hg), respectively, l is the membrane thickness (cm) and N is the steady-state flux (cm$^3$/s). Permeation measurements were repeated with at least 3 different membrane samples prepared under identical conditions. The variation in permeability measurement was 5-10%. The data of permeability is given below in Table 4.

TABLE 4

Permeability coefficient (P)$^a$ of blend membranes

| | Polymer | |
|---|---|---|
| | $P_{H2}$ | $P_{o2}$ |
| PBI-I$^b$ | 0.63 | 0.015 |
| PBI-I + P [PDADMA][TFMS]-5 | 0.47 | 0.008 |
| PBI-I + P [PDADMA][TFMS]-15 | 0.63 | 0.025 |
| PBI-I + P [PDADMA][TFMS]-25 | 0.64 | 0.026 |
| PBI-I + P [PDADMA][TFMS]-35 | 0.81 | 0.028 |
| PBI-I + P [PDADMM][TFMS]-45 | 0.90 | 0.046 |

$^a$Expressed in Barrer (1 Barrer = 10$^{-10}$ cm$^3$ · (STP) · cm/cm$^2$ · s · cm Hg),
$^b$SCK JMS 286 (2006) 161-169.

Example 8: Conductivity of Blend Membranes Based on PBI and [PDADMA][TFMS]

The ionic conductivity measurements of the electrolyte films were carried out by an impedance analyzer with a cell, in which the electrolyte films were sandwiched between two symmetrical gold coated stainless-steel electrodes and connected to the analyzer by Pt wires. The impedance measurements were performed over the frequency range from 10 Hz to 1 MHz with amplitude of 10 mV at different temperatures in the range of 50-200° C. The measurements were all performed in a thermo-controlled cell under anhydrous conditions.

Figure 2:
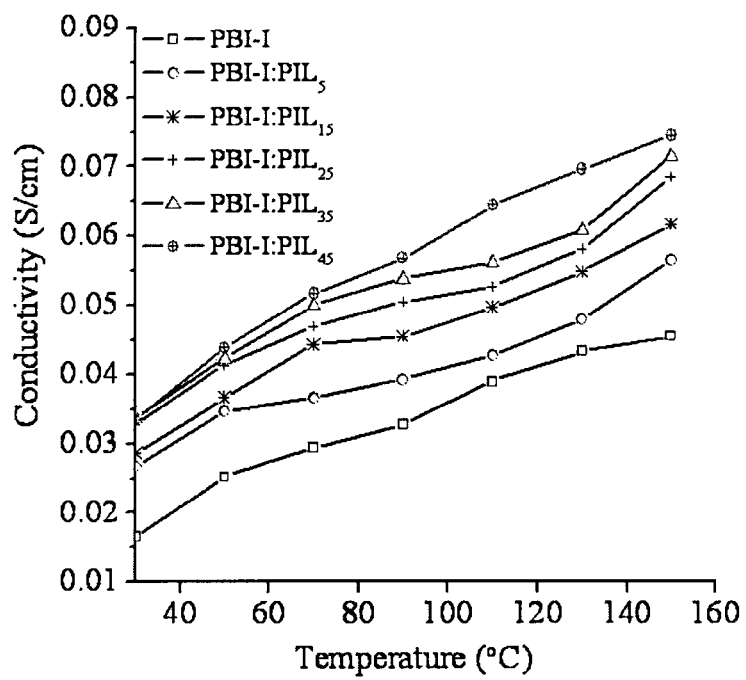
FIG. 2 depicts the proton conductivity as a function of temperature.

The conductivity (σ) was calculated as follows:

$$\sigma = \frac{1L}{RA}$$

where R, L, and A are the measured resistance, thickness, and cross-sectional area of the membrane, respectively. The proton conductivity results are shown in FIG. 2.

It was found that conductivity increased with increasing temperature as well as with the PIL content. The proton conductivity of the PBI membrane was 0.04 S cm$^{-1}$ at 150° C., which further increased up to 0.07 S cm$^{-1}$ for PBI-PIL$_{45}$ at the same temperature.

Example 9: Single Cell Performance

Figure 8:
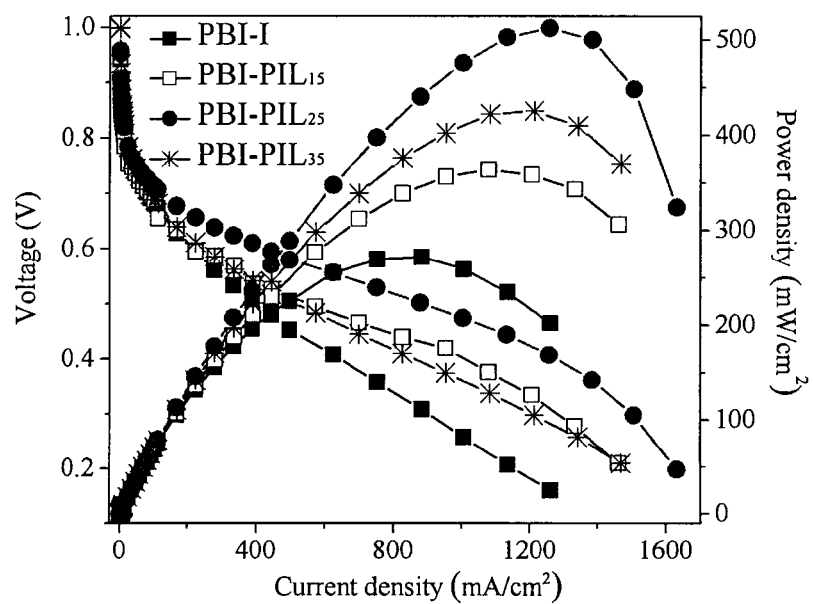
FIG. 8 depicts Single cell MEA testing of blend membranes.
Figure 9:
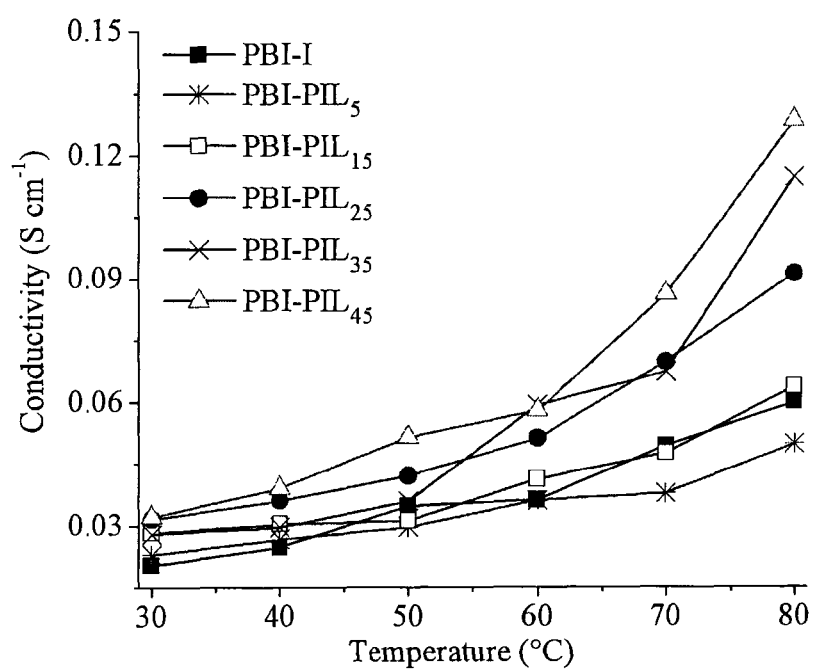
FIG. 9 depicts Hydroxide ion conductivity as a function of temperature.

FIG. 8 shows the single cell performance of PBI-I, PBI-PIL$_{15}$, PBI-PIL$_{25}$ and PBI-PIL$_{35}$ as membrane electrolytes at an operating temperature of 160° C. The performance assessment was conducted on a 9 cm$^2$ MEA prepared by using the blend membrane (approx. 200 μm-thick) and Pt/C (40 wt % Pt supported on active carbon) as the catalyst both in the anode and cathode, by maintaining a Pt loading of 1 mg cm$^{-2}$ on both the electrodes. The open circuit potentials (OCPs) and power densities of these MEAs at 160° C. were found to be 0.88, 0.94, 0.96, 0.98 V and 277, 364, 512, 440 mW cm$^2$ respectively. The higher OCP was an indication of the absence of fuel crossover from the anode to the cathode through the membrane. The maximum current densities obtained were 1261, 1467, 1632 and 1478 mA cm$^{-2}$, respectively. As shown in FIG. 8, the PIL content in the membrane improved the cell performance compared to PBI-I for all the loading levels of PIL. The performance was found to be highest for PBI-PIL$_{25}$ blend composition. With further increase in PIL content to 35%, the electrochemical performance was reduced indicating that a balance between PBI and PIL content is necessary in the blend membranes.

INDUSTRIAL ADVANTAGES

Membranes possess hydrolytic stability
Membranes possess oxidative stability
Membranes have enhanced proton conductivity
Useful for electrochemical applications such as fuel cell.

The invention claimed is:
1. A stable blend membrane comprising polybenzimidazole (PBI) and polymeric ionic liquid (PIL) Poly (diallyl dimethyl ammonium) trifluoromethane sulphonate P[PDADMA][TFMS] with enhanced proton and hydroxyl ion conductivity.
2. The stable blend membrane according to claim 1, wherein said PBI is PBI-I, and the weight ratio of PBI-I:PIL in the blend membrane is selected from 95:5, 85:15, 75:25, 65:35 and 55:45.
3. The stable blend membrane according to claim 1, wherein said blend membrane is doped with phosphoric acid having a molarity in the range of 1-17M.
4. The stable blend membrane according to claim 1, wherein said blend membrane has a thickness in the range 25-300 μm.
5. A process for the preparation of the blend membrane of PBI and P[PDADMA][TFMS] according to claim 1, said process comprising:
  adding a solution of P[DADMA][TFMS] in DMSO to a solution of PBI-I in Dimethylacetamide (DMAc) at room temperature;
  stirring until completely mixed for 11-13 h to form a mixed solution;
  casting the mixed solution on a flat glass surface to obtain dense blend membranes;
  drying in vacuum at a temperature of about 80° C. for about 8 days to remove residual solvent; and
  doping the blend membrane with phosphoric acid.
6. The process according to claim 5, wherein P[DADMA][TFMS] is prepared using anion exchange of P[DADMA][Cl] comprising:
  adding an equimolar quantity of silver salt to about 8% solution of P[DADMA][Cl] prepared in water;
  stirring at ambient temperature to ensure maximum possible exchange; and
  further centrifuging to separate AgCl followed by evaporation of the supernatant solution to obtain PIL, P[DADMA][TFMS].
7. The process according to claim 6, wherein the silver salt is selected from a metal salt of carboxylate, sulfonate, halogen, $NO_3^-$, $NO_2^-$, $PO_3^-$, $BF_4^-$, $HPO_4^-$ $N(SO_2CF_3)^-_2$, $H_2PO_4^-$, $HSO_4^-$, $S_2O_3^-$, $ClO^-$, $BrO_3^-$, $CrO_4^-$, $HCO_3^-$, $C_2O_4^-$, $MnO_4^-$, $NH_2^-$, $FeCl_4^-$, $PF_6^-$, $(CN)_2N^-$, $C_{16}H_{34}PO_4^-$, $C_{12}H_{25}C_6H_4O_3^-$, $SCN^-$, $CH_2$=$CHCOOCH_2$, $CH_2CH_2SO_3^-$, $CH_2$=$CHSO_3^-$, and $C_6H_4CO_3SN^-$.
8. The stable blend membrane according to claim 1, wherein proton and hydroxyl ion conductivity of the stable blend membrane is in the range 0.03-0.08 and 0.04-0.14 Scm$^{-1}$ respectively.
9. The stable blend membrane according to claim 1, wherein the stable blend membrane of PBI and P[PDADMA][TFMS] is configured for use as a membrane electrolyte for high temperature PEMFC.

* * * * *